US010060154B2

(12) United States Patent
McCue et al.

(10) Patent No.: US 10,060,154 B2
(45) Date of Patent: Aug. 28, 2018

(54) PROTECTIVE BARRIER

(71) Applicant: McCue Corporation, Peabody, MA (US)

(72) Inventors: David S. McCue, Manchester, MA (US); Thomas Ustach, Revere, MA (US); Timothy David Stratford, Milton Keynes (GB)

(73) Assignee: McCue Corporation, Peabody, MA (US)

( * ) Notice: Subject to any disclaimer, the term of this patent is extended or adjusted under 35 U.S.C. 154(b) by 602 days.

(21) Appl. No.: 14/658,777

(22) Filed: Mar. 16, 2015

(65) Prior Publication Data
US 2015/0259866 A1    Sep. 17, 2015

Related U.S. Application Data

(60) Provisional application No. 61/953,190, filed on Mar. 14, 2014, provisional application No. 62/073,308, filed on Oct. 31, 2014.

(51) Int. Cl.
*E04H 17/14*    (2006.01)
*B65G 1/02*    (2006.01)
*E01F 15/14*    (2006.01)

(52) U.S. Cl.
CPC .............. *E04H 17/14* (2013.01); *B65G 1/02* (2013.01); *E01F 15/141* (2013.01)

(58) Field of Classification Search
CPC ... E01F 15/04; E01F 15/0453; E01F 15/0461; E01F 15/08; E01F 15/086; E01F 15/14; E01F 15/141; E01F 15/143; E01F 15/145; E01F 15/146; E01F 13/00; E01F 13/022; E04H 17/14; E04H 17/1413; E04H 17/1421; E04H 17/16; E04H 17/168;
(Continued)

(56) References Cited

U.S. PATENT DOCUMENTS 4,183,504 A * 1/1980 Ford ..................... E01F 15/146
256/13.1
4,954,009 A    9/1990 Kellison
(Continued)

FOREIGN PATENT DOCUMENTS

AU    2012/201517    4/2012
EP    0 297 182    * 1/1989    .............. E01F 15/00
(Continued)

*Primary Examiner* — Michael P Ferguson
(74) *Attorney, Agent, or Firm* — Occhiuti & Rohlicek LLP

(57) ABSTRACT

A protective barrier includes a hollow plastic rail including first and second ends, a rounded metallic member disposed on the first end and a second metallic member disposed on the second end. The rounded metallic member includes a first opening for receiving the first end of the hollow plastic rail, a first anchoring mechanism for anchoring the rounded metallic member and the first end of the hollow plastic rail to a surface, and a rounded protrusion disposed on an outer surface of the rounded metallic member for receiving a force of impact and deflecting the force of impact away from the rounded metallic member. The second metallic member includes a second opening for receiving the second end of the hollow plastic rail and a second anchoring mechanism for anchoring the second metallic member and the second end of the hollow plastic rail to the surface.

16 Claims, 7 Drawing Sheets

(58) Field of Classification Search
CPC . E04H 17/20; E04H 17/22; E04H 2017/1447;
E04H 2017/1456; E04H 2017/1452;
E04H 2017/1465
See application file for complete search history.

(56) References Cited

U.S. PATENT DOCUMENTS

| | | | | |
|---|---|---|---|---|
| 5,030,029 | A * | 7/1991 | Johnsen | E01F 13/02 |
| | | | | 116/202 |
| 5,891,534 | A * | 4/1999 | Sabin | A47B 96/02 |
| | | | | 428/11 |
| 6,242,070 | B1 * | 6/2001 | Gillispie | E01F 15/141 |
| | | | | 428/122 |
| 6,745,530 | B2 * | 6/2004 | Nesbitt | E04H 17/20 |
| | | | | 52/300 |
| 7,338,033 | B2 * | 3/2008 | Anson | E01F 13/022 |
| | | | | 256/59 |
| 7,770,861 | B2 * | 8/2010 | Huxtable | A47B 95/043 |
| | | | | 248/345.1 |
| 2004/0057790 | A1 | 3/2004 | Tagg | |
| 2009/0003931 | A1 | 1/2009 | Christensen et al. | |
| 2010/0212227 | A1 | 8/2010 | Perkins et al. | |
| 2012/0301219 | A1 * | 11/2012 | McCue | E01F 9/629 |
| | | | | 404/6 |
| 2013/0248791 | A1 | 9/2013 | Bullock | |
| 2014/0196997 | A1 * | 7/2014 | Michael | E01F 15/141 |
| | | | | 188/377 |

FOREIGN PATENT DOCUMENTS

| | | | | |
|---|---|---|---|---|
| EP | 2 418 325 | * | 2/2012 | ............ E01F 15/14 |
| KR | 101245666 | | 3/2013 | |
| WO | 2012/109613 | | 8/2012 | |

* cited by examiner

PROTECTIVE BARRIER

RELATED APPLICATIONS

This application claims priority to, and the benefit of, Provisional Application Ser. No. 61/953,190, filed Mar. 14, 2014 and Provisional Application Ser. No. 62/073,308, filed Oct. 31, 2014. All of the above applications are hereby entirely incorporated herein by reference.

FIELD OF THE INVENTION

This invention relates to a protective barrier for an industrial facility.

BACKGROUND

Warehouses, distributions centers, factories, and similar facilities often have large stock handling equipment such as fork trucks which frequently move stock into, out of, and around the facility. In some examples, the stock is stored on shelving (e.g., pallet racks) and stock handling equipment must navigate through the shelving to move stock to and from the shelving. Some facilities may have other obstacles (e.g., support columns or walls) which the stock handling equipment must navigate around as it travels through the facility.

SUMMARY

As an operator navigates stock handling equipment through a facility, it is possible for the operator to inadvertently cause the stock handling equipment to collide with obstacles such as shelving, support columns, or walls. Such collisions are especially common as the stock handling equipment is navigated around corners (e.g., a corner of a pallet rack). When stock handling equipment collides with an obstacle, both the obstacle and the stock handling equipment can become damaged. In the case of shelving, a strong enough collision can cause the shelving to collapse.

In one general aspect, a protective barrier is configured to protect an end of a shelf (e.g., a pallet rack) from both glancing collisions and direct collisions with stock handling equipment. The protective barrier includes a plastic bumper rail with two ends. A rounded metallic end cap is installed at each of the two ends of the plastic bumper rail.

The protective barrier is positioned and anchored into the ground at an end of a shelf such that the metallic end caps surround the corners of the shelf. The rounded shape of the metallic caps deflects stock handling equipment that is about to collide with a corner of the end of the shelf away from the corner, thereby preventing a collision between the shelf and the stock handling equipment. By deflecting the collision, the force of the collision between the barrier and the stock handling equipment is also reduced, preventing significant damage to the stock handling equipment and to the barrier.

The plastic bumper rail of the protective barrier prevents the stock handling equipment from directly colliding with the end of the shelf by absorbing the force of direct collisions between the barrier and the stock handling equipment, thereby preventing damage to the shelf and to the stock handling equipment.

In another general aspect, a protective barrier is configured to protect a corner such as a corner of a wall in a heavily traveled area. The protective barrier includes two plastic rails which are connected at an angle (e.g., a right angle) by a rounded metallic connector. In some examples, additional plastic bumper rails are attached to one or both of the two plastic bumper rails using a straight metallic connector for the purpose of extending the barrier. The ends of the plastic bumper rails which are not connected to other plastic bumper rails are inserted into rounded metallic end caps. The entire barrier is anchored to the ground through the rounded metallic connector, the straight metallic connectors, and the rounded metallic end caps.

The rounded metallic connector connecting the rails deflects stock handling equipment that is about to collide with a corner of a wall, thereby preventing a collision between the corner and the stock handling equipment. By deflecting the collision, the force of the collision is also reduced, preventing significant damage to the stock handling equipment and to the barrier. The rounded metallic end caps deflect stock handling equipment that is about to collide with the ends of the barrier, preventing significant damage to the stock handling equipment and the barrier.

The plastic bumper rails prevent the stock handling equipment from directly colliding with the wall by absorbing the force of direct collisions, thereby preventing damage to the wall and the stock handling equipment.

In another general aspect, a protective barrier is configured to protect an enclosed area such as an area around a support column from both glancing and direct collisions with stock handling equipment. The protective barrier includes a number plastic bumper rails which are interconnected by a number of rounded metallic connectors. For example, in the case of a column, the protective barrier includes four plastic bumper rails which are interconnected by four rounded metallic connectors, forming a square or rectangular barrier around the column. The entire barrier is anchored into the ground through the rounded metallic connectors.

The rounded shape of the metallic caps deflects stock handling equipment that is about to collide with a corner of the column away from the corner, thereby preventing a collision between the corner and the stock handling equipment. By deflecting the collision, the force of the collision is also reduced, preventing significant damage to the stock handling equipment and to the barrier.

The plastic bumper rails prevent the stock handling equipment from directly colliding with the column by absorbing the force of direct collisions, thereby preventing damage to the column and the stock handling equipment.

In a general aspect, a protective barrier includes a hollow plastic rail including a first end and a second end, a rounded metallic member disposed on the first end of the hollow plastic rail and a second metallic member disposed on the second end of the hollow plastic rail. The rounded metallic member includes a first opening for receiving the first end of the hollow plastic rail, a first anchoring mechanism for anchoring the rounded metallic member and the first end of the hollow plastic rail to a surface, and a rounded protrusion disposed on an outer surface of the rounded metallic member for receiving a force of impact and deflecting the force of impact away from the rounded metallic member. The second metallic member includes a second opening for receiving the second end of the hollow plastic rail and a second anchoring mechanism for anchoring the second metallic member and the second end of the hollow plastic rail to the surface.

In another general aspect, a cast metal end cap for a protective barrier includes an integrally formed hollow cast metal body including a first side wall having a distal end, a proximal end, and a top end, a second side wall having a distal end, a proximal end, and a top end, a top surface connecting the top end of the first side wall to the top end of the second side wall, and a rounded front wall connecting the distal end of the first side wall to the distal end of the second side wall, the rounded front wall including a first wall portion including an integrally formed protrusion and a second wall portion, the first wall portion having a wall thickness greater than a wall thickness of the wall second portion.

Aspects may include one or more of the following features.

The cast metal end cap may further include an integrally formed cast metal lid configured for insertion into an opening in a top surface of the cast metal body. The lid may include one or more arch shaped strengthening ribs formed integrally on a bottom surface of the cast metal lid. The first side wall may have a first surface facing and substantially parallel to a second surface of the second side wall, the first surface and the second surface each including one or more integrally formed ribs.

The cast metal end cap may also include a bottom surface interconnecting a bottom end of the first side wall, a bottom end of the second side wall, and a bottom end of the rounded front wall, and one or more strengthening ribs, each of the one or more strengthening ribs formed integrally with the bottom surface and one of: the first side wall, the second side wall, and the rounded front side wall. Each of the one or more strengthening ribs may have an arched shape.

The cast metal end cap may also include an integrally formed, rounded flange extending along a bottom end of the first side wall, a bottom end of the second side wall, and a bottom end of the rounded front wall. An inner surface of the rounded front wall facing an interior of the hollow cast metal body may include one or more integrally formed ribs.

In some examples, metallic end caps and connectors are fabricated using a sand casting fabrication process. Among other advantages, using a sand casting process can result in a fabrication process which is capable of fabricating castings (e.g., metallic end caps or connectors) with complex shapes and features in a single step. The resulting castings, including the complex shapes and features, have increased strength due to their integral nature. This is an advantage over other metal fabrication processes such as roll forming, which require multiple rolling, stamping, and welding steps to fabricate metal objects with complex shapes and features.

Other features and advantages of the invention are apparent from the following description, and from the claims.

DESCRIPTION

Shelf End Protective Barrier

Figure 1:
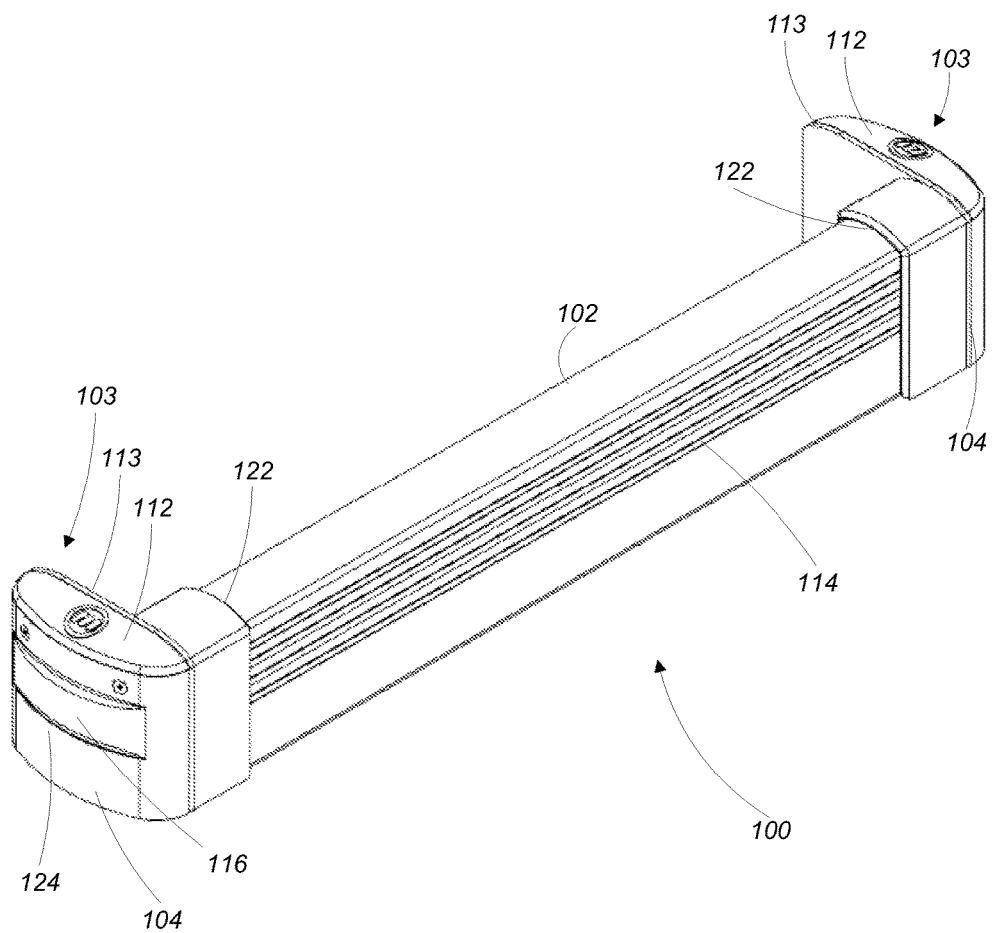
FIG. 1 is a shelf end protective barrier.

Referring to FIG. 1, a protective barrier 100 is configured to protect an end of a shelf (e.g., a pallet rack used in a warehouse, not shown) from unintended collisions. The protective barrier 100 includes a plastic bumper rail 102 and two rounded metallic end caps 104. The plastic bumper rail 102 includes two ends 103, each of which is inserted into one of the rounded metallic end caps 104 via an opening 122. The protective barrier 100 is anchored into the ground by fastening the two rounded metallic end caps 104 to the ground using an anchoring mechanism (as is described in greater detail below).

In some examples, the plastic bumper rail 102 is a hollow part formed by extruding high density polyethylene (HDPE). In some examples, the plastic bumper rail 102 includes ribs 114 which increase the amount of plastic material present in the wall of the plastic bumper rail 102, thereby increasing the rigidity and collision absorption capability of the plastic bumper rail 102.

Each of the rounded metallic end caps 104 is a substantially L-shaped metallic member with a first leg 118 and a second leg 120. The first leg 118 extends substantially parallel to the direction of extension of the plastic bumper rail 102 and includes the opening 122 for receiving one of the ends 103 of the plastic bumper rail 102. The second leg 120 extends from the first leg 118 in a direction substantially perpendicular to the direction of extension of the plastic bumper panel 102. An outer side 124 of the rounded metallic end cap 104 includes a rounded protrusion 116 which is intended to receive and deflect the force of any object colliding with the metallic end cap 104.

Each of the rounded metallic end caps 104 includes an anchoring mechanism access opening 113 which has a plastic cover 112 placed thereon. The plastic cover 112 covers the anchoring mechanism access opening to hide the anchoring mechanism from view and prevent debris from entering the anchoring mechanism.

In use, the protective barrier 100 is anchored into the ground at an end of a shelf (e.g., a pallet rack) such that the plastic bumper rail 102 serves as a protective barrier for the end of the shelf and the second legs 120 of the rounded metallic end caps 104 serve as a protective barrier for the corners of the shelf.

Figure 2:
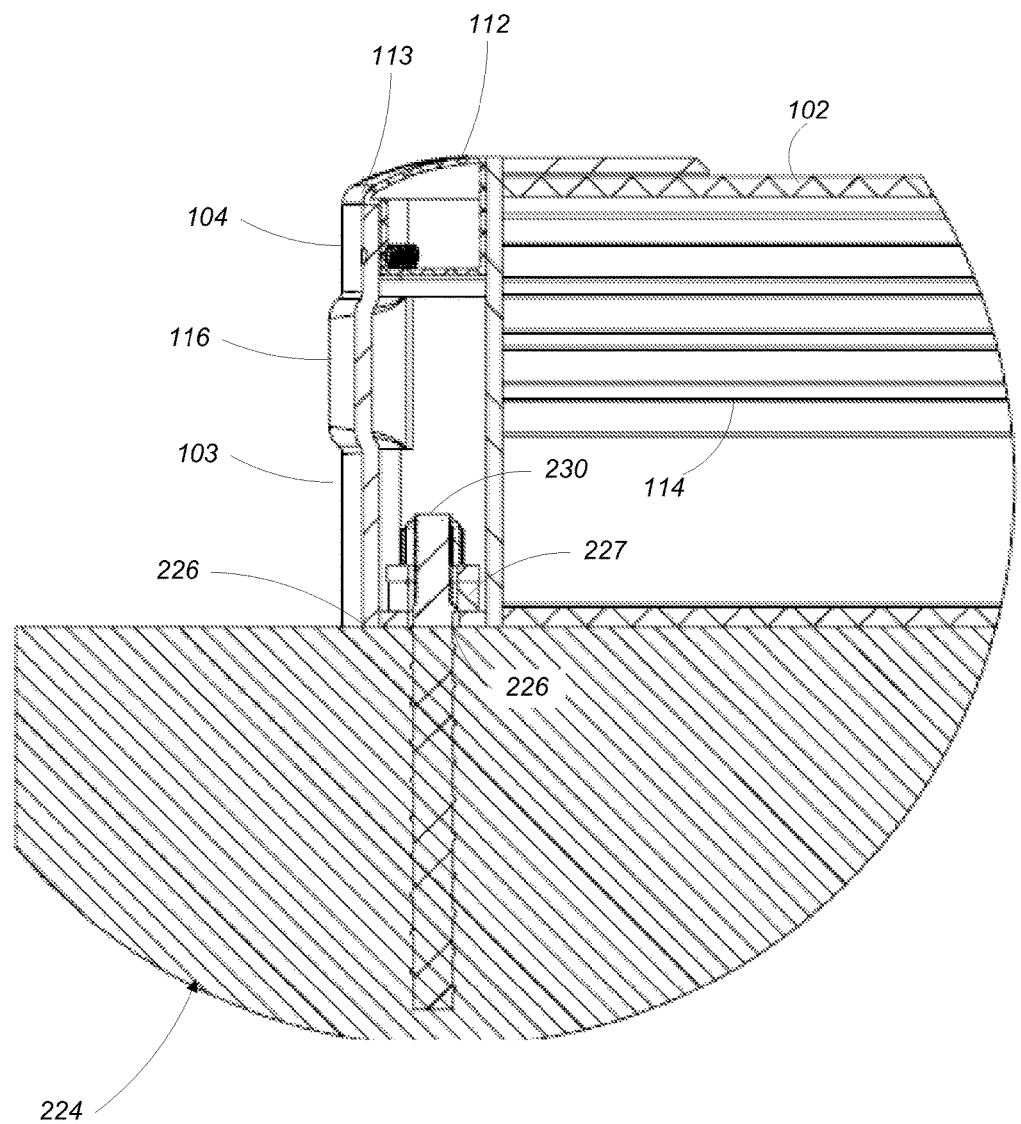
FIG. 2 is a cross-sectional view of an anchor point of the shelf end protective barrier of FIG. 1.

Referring to FIG. 2, a cross-sectional view of one of the rounded metallic end caps 104 illustrates the anchoring mechanism used to anchor the barrier 100 to the ground 224. In particular, a bottom surface 226 of the rounded metallic end cap 104 includes one or more through holes 228 through which a fastener 230 such as a bolt or a piece of rebar can be inserted. The fastener 230 extends into the ground 224 where it is fixed, thereby anchoring the rounded metallic end cap 104 and the barrier 100 as a whole into the ground 224. In some examples, the anchoring mechanism includes an impact absorbing mechanism such as the impact absorption mechanism described in U.S. Pat. No. 8,444,343 titled "Impact-Absorbing Anchoring Assembly for Protective Barrier," which is incorporated herein by reference.

Note that FIG. 2 also provides a clear illustration of how the plastic cover 112 prevents debris from entering the inside of the rounded metallic end caps 104 through the anchoring mechanism access opening 113.

Perimeter Protective Barrier

Figure 3:
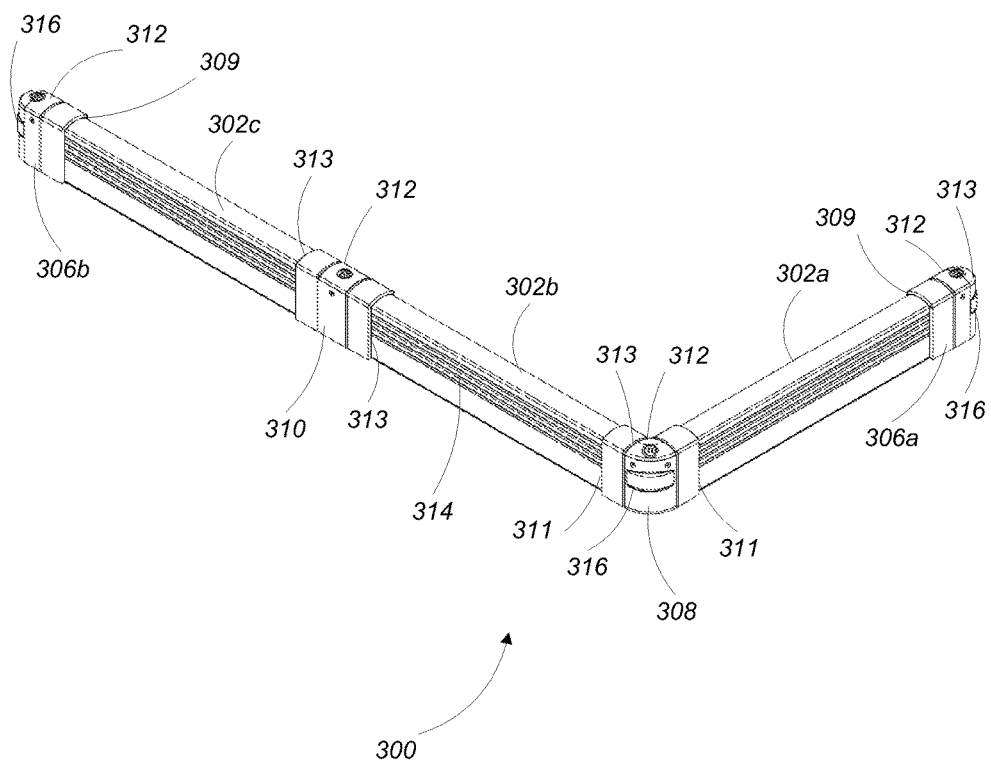
FIG. 3 is a perimeter protective barrier.

Referring to FIG. 3, another embodiment of a protective barrier 300 is configured to protect a corner (e.g., a corner of a wall, not shown) from unintended collisions with stock handling equipment. The protective barrier 300 is a substantially L-shaped barrier which includes a number of plastic bumper rails 302a-302c coupled to one another using various metallic connectors and end caps. In particular, in the embodiment of FIG. 3, the protective barrier 300 includes a first plastic bumper rail 302a, a second plastic bumper rail 302b, and a third plastic bumper rail 302c. The first plastic bumper rail 302a is coupled to the second plastic bumper rail 302b at a substantially right angle using a rounded metallic connector 308. The end of the first plastic bumper rail 302a which is not inserted into the rounded metallic connector 308 is inserted into a first rounded end-cap 306a. The end of the second plastic bumper rail 302b which is not inserted into the rounded metallic connector 308 is connected to the third plastic bumper rail 302c using a straight metallic connector 310. The end of the third plastic bumper rail 302c which is not inserted into the straight metallic connector 310 is inserted into a second metallic end cap 306b. Some or all of the metallic connectors 308, 310 and the metallic end caps 306a-306b are anchored to the ground using an anchoring mechanism (e.g., the anchoring mechanism of FIG. 2) within the metallic connectors 308, 310 or the metallic end caps 306.

In some examples, each of the plastic bumper rails 302a, 302b, 302c is a hollow part formed by extruding high density polyethylene (HDPE). In some examples, one or more of the plastic bumper rails 302a, 302b, 302c includes ribs 314 which increase the amount of plastic material present in the wall of the plastic bumper rail, thereby increasing the rigidity and collision absorption capability of the plastic bumper rails 302a, 302b, 302c.

The rounded metallic end caps 306a, 306b are placed over the ends of the first and third plastic bumper rails 302a, 302c to deflect any collisions between the ends of the plastic bumper rails 302a, 302c and stock handling equipment. Each of the rounded metallic end caps 306a, 306b includes an opening 309 for receiving the ends of the first and third plastic bumper rails 302a, 302c. Each of the rounded metallic end caps 306a, 306b also includes an outward facing a rounded protrusion 316 which is intended to receive and deflect the force of any object colliding with the rounded metallic end caps 306a, 306b.

The rounded metallic connector 308 includes two openings 311 for receiving the ends of the first and second plastic bumper rails 302a, 302b. The rounded metallic connector 308 also includes a rounded protrusion 316 which is intended to receive and deflect the force of any object colliding with the rounded metallic connector 308.

The straight metallic connector 310 includes openings 313 for receiving the ends of the second and third plastic bumper rails 302b, 302c. Very generally, the straight metallic connector 310 is used to anchor the barrier 300 as the length of the protective barrier 300 is extended by including additional sections of plastic bumper rail. For example, in some applications it is important to add short pieces of plastic bumper rail separated by anchored straight metallic connectors in order to maintain the collision absorption capability of the protective barrier 300. In particular, as the length of a particular section of plastic bumper rail between two connectors increases, the capability of the protective barrier 300 to absorb a collision at that plastic bumper rail decreases. In some examples, a straight metallic connector is installed for approximately every 5' of plastic bumper rail.

Each of the rounded metallic end caps 306, the rounded metallic connector 308, and the straight connector piece 310 includes an anchoring mechanism access opening 313 which has a plastic cover 312 placed thereon. The plastic cover 312 covers the anchoring mechanism access opening 313 to hide the anchoring mechanisms of the rounded metallic caps 306 and the rounded metallic connectors 308, 310 from view and prevent debris from entering the anchoring mechanisms.

In use, the protective barrier 300 is anchored into the ground at a corner (e.g., a corner of a wall) such the plastic bumper rails 302a, 302b, 302c serve as a protective barrier for the walls on either side of the corner and the rounded metallic connector 308 serves as a protective barrier for the corner.

Column Protective Barrier

Figure 4:
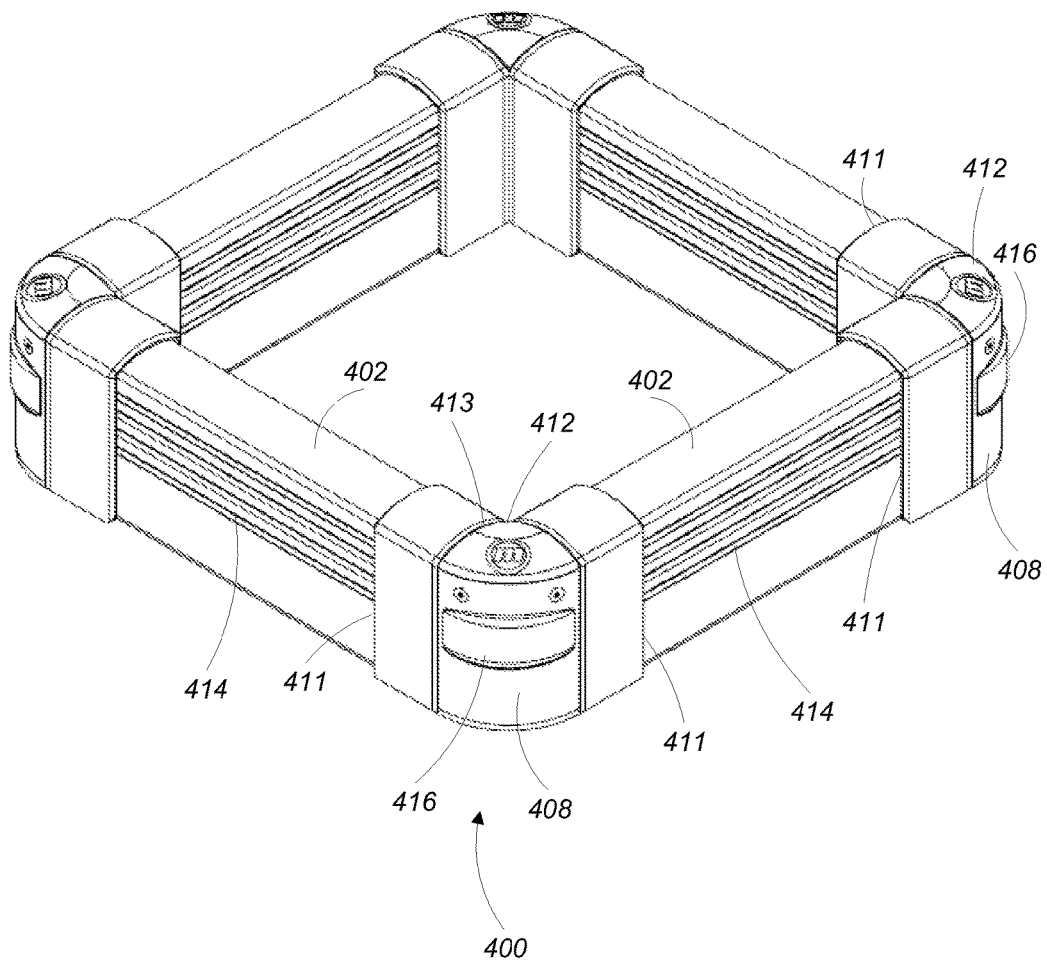
FIG. 4 is a column protective barrier.

Referring to FIG. 4, another example of a protective barrier 400 is configured to protect a column from unintended collisions with stock handling equipment. The protective barrier 400 is a substantially square or rectangular shaped barrier which includes a number of plastic bumper rails 402 coupled to one another using four rounded metallic connectors 408. In the particular embodiment of FIG. 4, there are four plastic bumper rails 402. Each rounded metallic connector 408 is coupled to two of the plastic bumper rails 402, forming a substantially right angle between the two plastic bumper rails 402. When fully assembled, the four rounded metallic connectors 408 are connected to the four plastic bumper rails 402 such that a square protective barrier 400 is formed.

In some examples, each of the plastic bumper rails 402 is a hollow part formed by extruding high density polyethylene (HDPE). In some examples, one or more of the plastic bumper rails 402 includes ribs 414 which increase the amount of plastic material present in the wall of the plastic bumper rail 402, thereby increasing the rigidity and collision absorption capability of the plastic bumper rails 402.

Each of the rounded metallic connectors 408 includes two openings 411 for receiving the ends of the plastic bumper rails 402. Each rounded metallic bumper member includes, on its outer side, a rounded protrusion 316 which is intended to receive and deflect the force of any object colliding with the rounded metallic connector 408.

Each of the rounded metallic connectors 408 includes an anchoring mechanism access opening 413 which has a plastic cover 412 placed thereon. The plastic cover 412 covers the anchoring mechanism access opening 413 to hide the anchoring mechanisms of the rounded metallic connectors 408 and prevent debris from entering the anchoring mechanisms.

In use, the protective barrier 400 is anchored into the ground such that it surrounds a column. The plastic bumper rails 402 serve as a protective barrier against direct collisions and the rounded metallic connectors 408 deflect indirect collisions with the column.

Sand Cast Components

In some examples, the metallic end caps and connectors used in the barriers described above can be fabricated using a sand casting process. Very generally, sand casting is a metal casting process that uses sand as the mold material. Due to the versatility of sand as a mold material, the metallic end caps and connectors can be cast with features (e.g., varied shapes and wall thicknesses) that would be difficult or impossible to achieve using other metal fabrication techniques (e.g., roll-forming). Furthermore, sand casting of a metallic end cap or connectors, including the features, can be accomplished in a single step, yielding a metallic end cap or connector that integrally includes the features. In general, such integrally formed features are stronger than features which are, for example, welded onto a previously fabricated piece.

Figure 5:
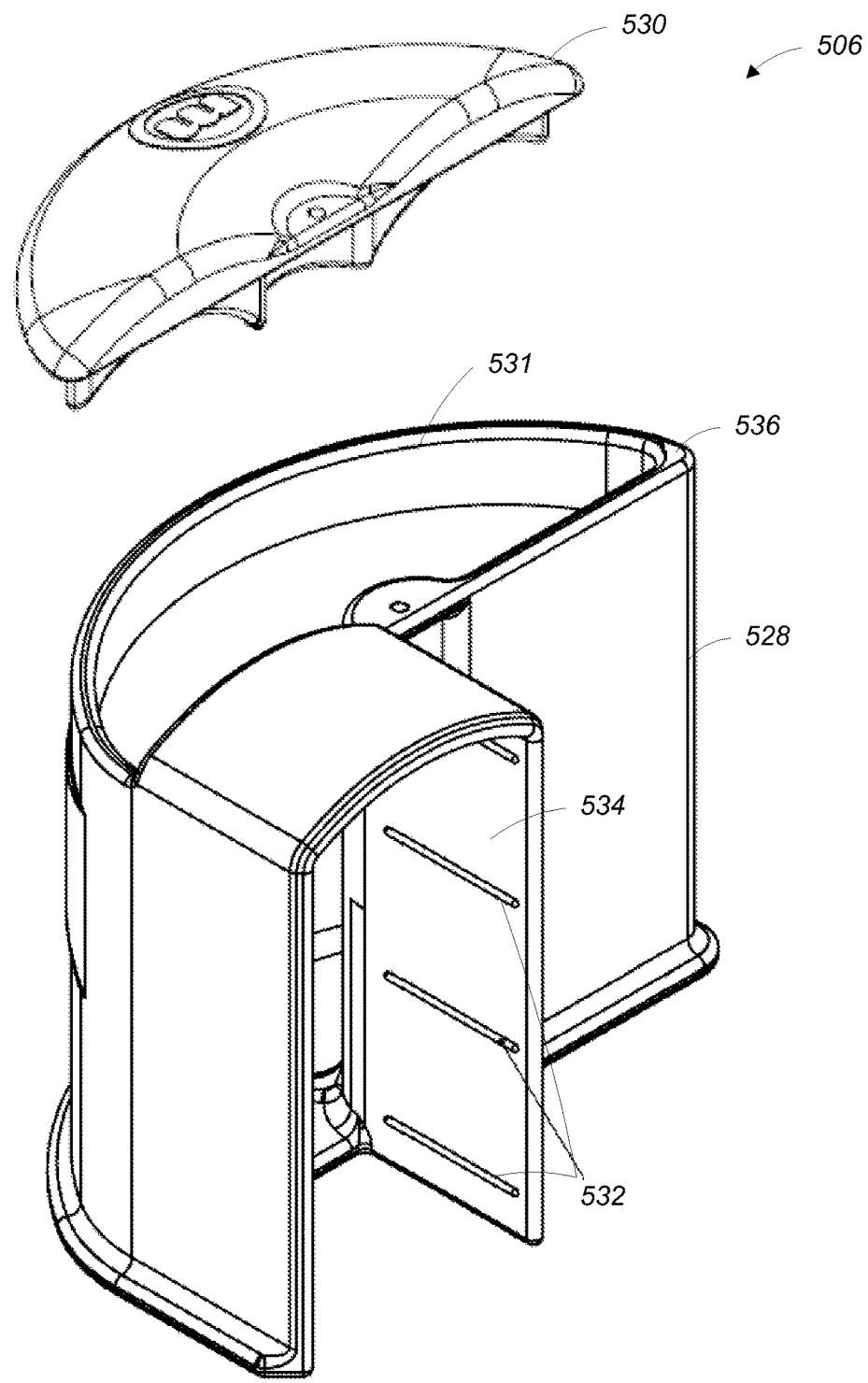
FIG. 5 is a perspective view of a sand cast rounded metallic end cap.

Referring to FIG. 5, an embodiment of a rounded metallic end cap 506 includes a sand cast body 528 and a sand cast lid 530. When fully assembled, the sand cast lid 530 is inserted into a top opening 531 in the sand cast body 528. Both the sand cast body 528 and the sand cast lid 530 include a number of features, described below, that are made possible by using the sand casting fabrication process.

In some examples, the sand cast body 528 includes a number of ribs 532 and an area of increased wall thickness at a corner 536 of the sand cast body 528. In some examples, the ribs 532 are disposed within a side opening 534 in the sand cast body 528. As was the case for previously described embodiments of rounded metallic end caps, the side opening 534 in the sand cast body 528 is configured to receive a plastic bumper rail (not shown). When the plastic bumper rail is inserted into the side opening 534, the ribs 532 contact the plastic bumper rail to ensure a tight, toleranced fit between the sand cast body 528 and the plastic bumper rail.

In some examples, the area of increased wall thickness at the corner 536 of the sand cast body 528 is an area where stress is likely to be concentrated. By thickening the wall at the corner 536 of the sand cast body 528, the wall at the corner 536 of the sand cast body 528 is less likely to become damaged due to the stress caused by a force of an impact (e.g., by stock handling equipment) on the rounded metal end cap 506.

Figure 6:
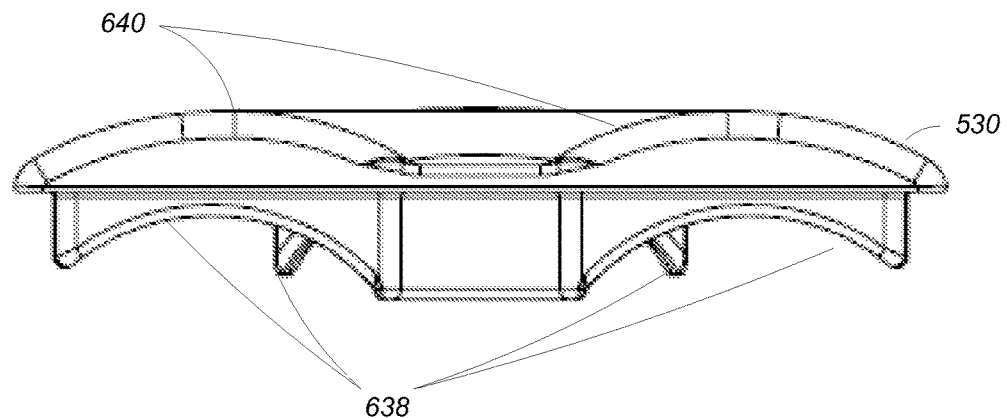
FIG. 6 is a front view of a sand cast lid.

Referring to FIG. 6, a front view of the sand cast lid 530 shows that, in some examples, the sand cast lid 530 includes a number of curved ribs 638 and complex curvatures on its top surface 640.

The curved ribs 638 add strength to the lid 530 and distribute stress throughout the lid 530. When the sand cast lid 530 is inserted into the top opening 531 of the sand cast body 528, the curved ribs 638 also receive and distribute the forces of impacts on the sand cast body 528. The complex curvatures on the top surface 640 of the sand cast lid 530 can be used to optimize strength of the sand cast lid 530 while minimizing material use.

Figure 7:
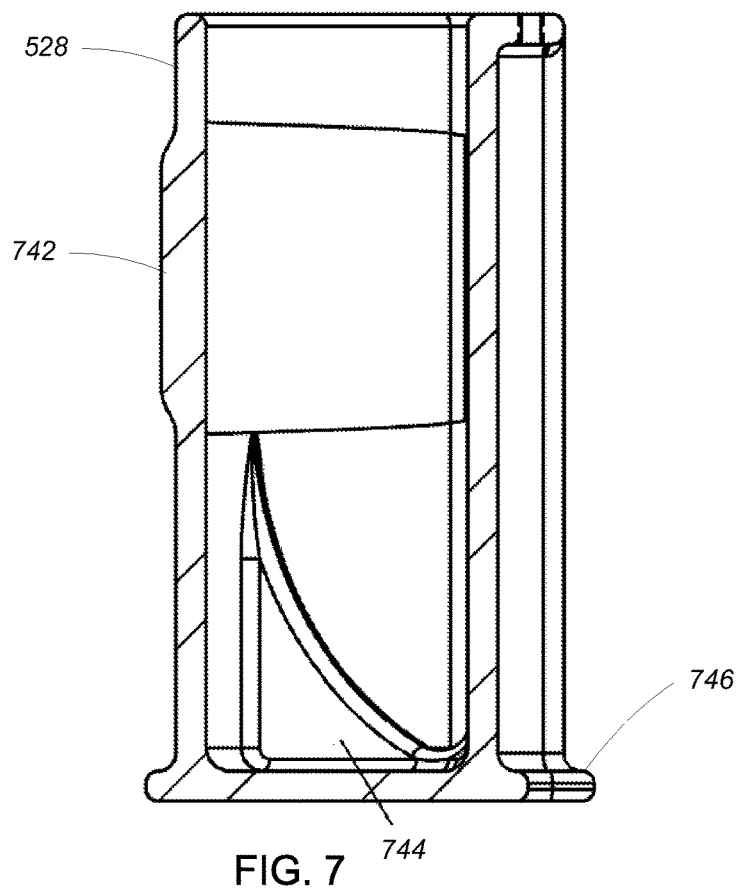
FIG. 7 is a cross-sectional view of a sand cast body.

Referring to FIG. 7, a cross sectional view of the sand cast body 528 shows that, in some examples, the sand cast body includes an additional area of increased wall thickness 742, one or more curved support features 744, and a flange 746.

In some examples, the additional area of increased wall thickness 742 is located on a portion of the sand cast body 528 that is likely to be struck (e.g., by stock handling equipment). The increased thickness of the wall resists damage to the wall in the event that the sand cast body 528 is struck. The curved support features 744 are integrally formed with the sand cast body 528 and add strength to and improve stress distribution in the sand cast body 528. It is noted that the term 'integrally formed' object as is used throughout this specification precludes objects that are formed (e.g., cast, cut, or extruded) separately and are then welded or otherwise joined together.

The flange 746 is formed integrally with the sand cast body 528, reduces stress on the sand cast body 528 in the event of an impact, and prevents damage to a surface (e.g., concrete) onto which the sand cast body 528 is mounted in the event that the sand cast body 528 is struck (e.g., by stock handling equipment).

Figure 8:
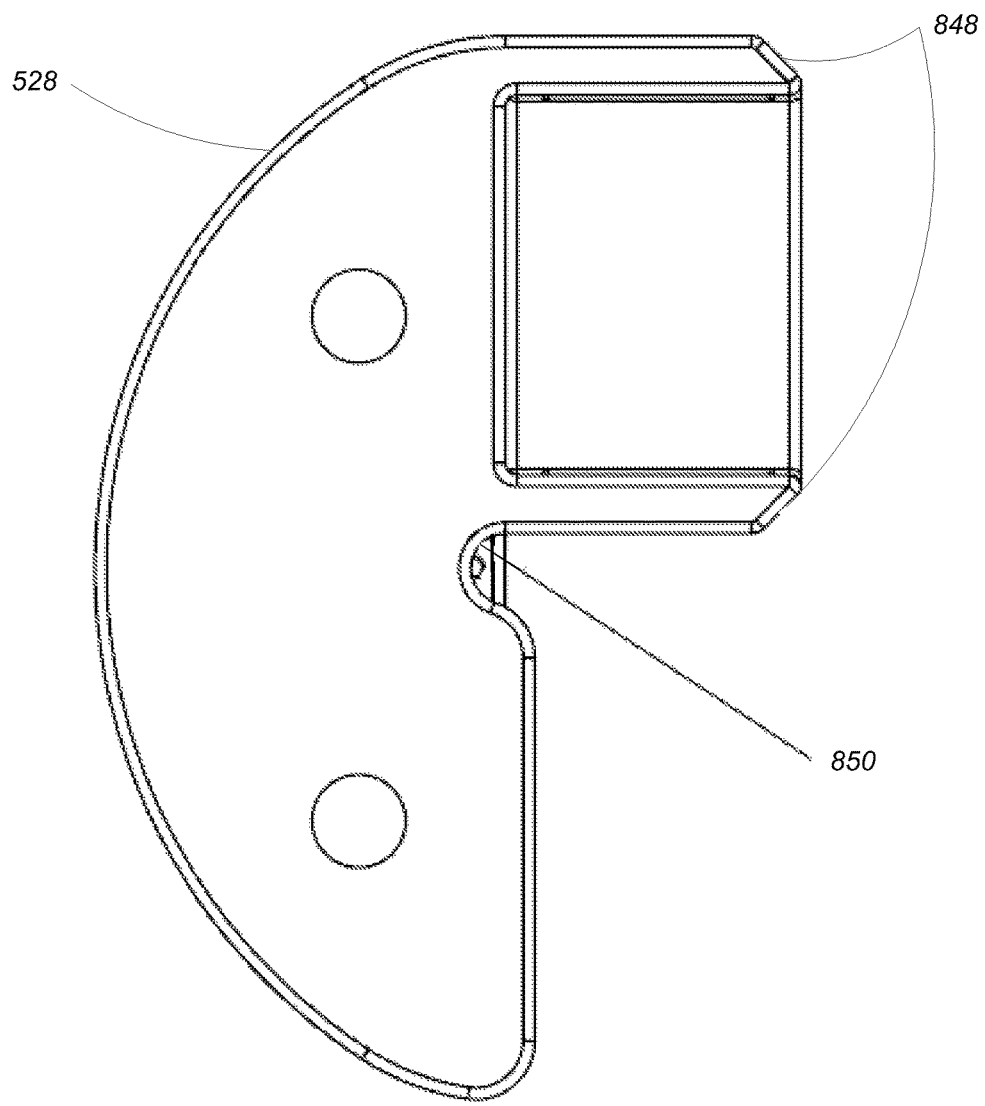
FIG. 8 is a bottom view of the sand cast body.

Referring to FIG. 8, a bottom view of the sand cast body 528 shows that, in some examples, the walls of the sand cast body 528 include chamfered leading edges 848 and curved areas 850. The chamfered leading edges 848 to eliminate points on the sand cast body 528 where object (e.g., a part of a piece of stock handling equipment) can easily catch. The curved areas 850 in the walls improve stress distribution (e.g., by acting as a shock absorber).

Alternatives

It should be noted that, while the protective barrier configurations described above are especially useful, many other protective barrier configurations are possible. Indeed, the individual components can be combined into a virtually unlimited number of configurations.

In some examples, the size and shape of the protrusions described above are configured to be dent resistant. In some examples, the protrusions are formed by stamping the desired protrusion shape into the metal.

In some examples, the bumper rails are made of an HDPE material with a high visibility color (e.g., yellow). In some examples, the metallic connector pieces and end caps are painted with a paint having a high visibility color (e.g., yellow).

In some examples, an epoxy resin is used to anchor the barriers described above to the ground.

It is to be understood that the foregoing description is intended to illustrate and not to limit the scope of the invention, which is defined by the scope of the appended claims. Other embodiments are within the scope of the following claims.

What is claimed is:

1. A protective barrier comprising:
a hollow plastic rail including a first end and a second end;
a rounded metallic member disposed on the first end of the hollow plastic rail, the rounded metallic member including:
a first opening for receiving the first end of the hollow plastic rail,
a first anchoring mechanism for anchoring the rounded metallic member and the first end of the hollow plastic rail to a surface,
a rounded protrusion disposed on an outer surface of the rounded metallic member for receiving a force of impact and deflecting the force of impact away from the rounded metallic member,
a first side wall having a first distal end, a first proximal end, and a first top end,
a second side wall having a second distal end, a second proximal end, and a second top end,
a top surface connecting the first top end of the first side wall to the second top end of the second side wall, the first opening being defined by the first and second side walls and the top surface,
a rounded front wall connecting the first distal end of the first side wall to the second distal end of the second side wall, the rounded front wall including a first wall portion defining the rounded protrusion disposed on the outer surface of the rounded metallic member and a second wall portion, the first wall portion having a wall thickness greater than a wall thickness of the wall second portion, and
a lid configured for insertion into an opening in the top surface; and
a second metallic member disposed on the second end of the hollow plastic rail, the second metallic member including:
a second opening for receiving the second end of the hollow plastic rail, and
a second anchoring mechanism for anchoring the second metallic member and the second end of the hollow plastic rail to the surface.

2. The protective barrier of claim 1 wherein a bottom surface of the lid includes one or more arch shaped strengthening ribs.

3. The protective barrier of claim 1 wherein the first side wall of the rounded metallic member includes a first surface facing and extending substantially parallel to a second surface of the second side wall, the first surface and the second surface each including one or more integrally formed ribs.

4. The protective barrier of claim 1 further including:
a bottom surface interconnecting a first bottom end of the first side wall, a second bottom end of the second side wall, and a third bottom end of the rounded front wall, and
one or more strengthening ribs, each of the one or more strengthening ribs coupled to the bottom surface and one of: the first side wall, the second side wall, and the rounded front side wall.

5. The protective barrier of claim 4 wherein each of the one or more strengthening ribs has an arched shape.

6. The protective barrier of claim 1 further comprising a rounded flange extending along a first bottom end of the first side wall, a second bottom end of the second side wall, and a third bottom end of the rounded front wall.

7. The protective barrier of claim 1 wherein an inner surface of the rounded front wall facing an interior of the rounded metallic member is coupled to one or more ribs.

8. The protective barrier of claim 1 wherein the anchoring mechanism includes a shock absorption mechanism for absorbing at least some of a force of impact on the protective barrier.

9. The protective barrier of claim 8 wherein the shock absorption mechanism includes a shock absorber with a fastener of the anchoring mechanism extending therethrough, the shock absorber being held between a surface of the fastener and a bottom surface of the rounded metallic member.

10. The protective barrier of claim 1 wherein the hollow plastic rail includes a plurality of stiffening ribs.

11. The protective barrier of claim 1 further including a bottom surface interconnecting a first bottom end of the first side wall, a second bottom end of the second side wall, and a third bottom end of the rounded front wall, wherein the bottom surface includes an opening through which a portion of the anchoring mechanism extends.

12. The protective barrier of claim 1 wherein the lid is a metallic lid.

13. The protective barrier of claim 1 wherein the second metallic member is a rounded metallic member, including a second rounded protrusion disposed on an outer surface of the second metallic member for receiving a force of impact and deflecting the force of impact away from the second metallic member.

14. The protective barrier of claim 1 wherein the second metallic member includes a third opening for receiving an end of a second hollow plastic rail.

15. The protective barrier of claim 1 wherein the hollow plastic rail includes a single extruded part extending from the first end of the plastic rail to the second end of the rail.

16. The protective barrier of claim 1 wherein the rounded protrusion is integrally formed.

* * * * *